United States Patent

Krenzer

[11] 3,925,054
[45] Dec. 9, 1975

[54] METHOD OF INCREASING THE YIELD OF PLANTS HAVING STORAGE ORGANS BY TREATMENT WITH TRIAZOLIDINONES

[75] Inventor: John Krenzer, Oak Park, Ill.

[73] Assignee: Velsicol Chemical Corporation, Chicago, Ill.

[22] Filed: Dec. 19, 1974

[21] Appl. No.: 532,110

[52] U.S. Cl.................. 71/92; 260/30 8C; 260/554
[51] Int. Cl.² .......................................... A01N 9/22
[58] Field of Search ............................ 71/92

Primary Examiner—Lewis Gotts
Assistant Examiner—Catherine L. Mills
Attorney, Agent, or Firm—Robert J. Schwarz; Dietmar H. Olesch

[57] ABSTRACT

This invention discloses a method of increasing the yield of plant food contained in plant storage organs which comprises contacting the plants having storage organs with from about 0.05 to about 4.0 pounds per acre of a compound of the formula

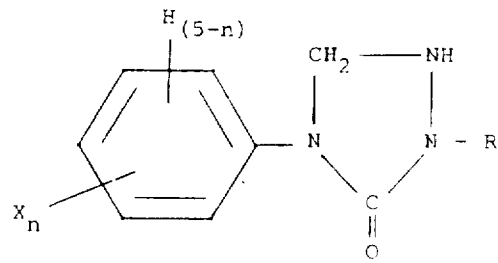

wherein X is selected from the group consisting of alkyl, alkoxy, alkylthio, halogen, haloalkyl and nitro; $n$ is an integer from 1 to 3; and R is alkyl.

7 Claims, No Drawings

METHOD OF INCREASING THE YIELD OF PLANTS HAVING STORAGE ORGANS BY TREATMENT WITH TRIAZOLIDINONES

This invention relates to a method of treating plants with storage organs, thereby increasing the yield of plant food contained in the storage organs.

A variety of chemicals has been investigated as plant growth stimulants and promoters in attempts to increase the yield obtained from cultivated crops. These investigations have met with varying success but have not led to compositions of any commercial significance. In many instances the benefit derived from such compositions is offset by damage to the plant, such as disfiguration.

It has now been found that certain triazolidinones have the ability of increasing the yield of plant food contained in plant storage organs without exhibiting substantial toxicity to the plants. More specifically the present invention resides in a method of increasing the yield of plant food contained in plant storage organs which comprises contacting plants having storage organs with from about 0.05 pound to about 4.0 pounds per acre of a compound of the formula

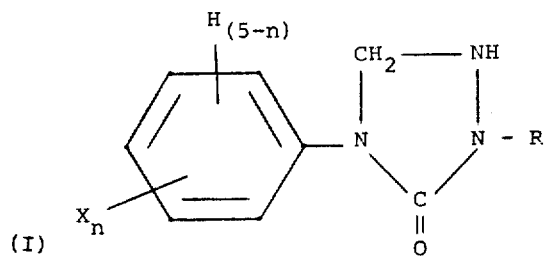

wherein X is selected from the group consisting of alkyl, alkoxy, alkylthio, halogen, haloalkyl and nitro; $n$ is an integer from 1 to 3; and R is alkyl.

In a preferred embodiment of this invention X is selected from the group consisting of lower alkyl, lower alkoxy, lower alkylthio, halogen, chloroalkyl, trifluoromethyl and nitro; and R is lower alkyl.

The term lower as used herein designates a straight or branched carbon chain of up to six carbon atoms.

The compounds of this invention can be prepared by reacting a semicarbazide of the formula

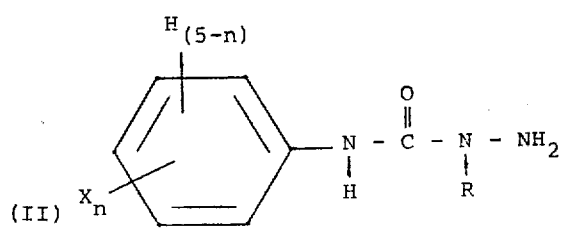

wherein X, n and R are as heretofore described, with formaldehyde. This reaction can be effected by combining a solution of a molar amount of the semicarbazide of formula II in a water miscible solvent such as methanol with an about equimolar or slight excess molar amount of aqueous formaldehyde. Inorganic base such as potassium hydroxide can be added to raise the pH of the reaction medium to from about 7 to about 9. This reaction can be carried out at room temperature or at slightly elevated temperatures such as temperatures ranging up to about 50°C. The reaction mixture can then be stirred or allowed to stand for a period of up to about 8 hours to ensure completion of the reaction and to precipitate solid product. The solid can then be recovered by filtration and can be dried to yield the desired product. This product can be used as such or can be further purified by conventional means such as recrystallization, washing and the like.

The semicarbazide of formula II can be prepared by reacting a molar amount of an isocyanate of the formula

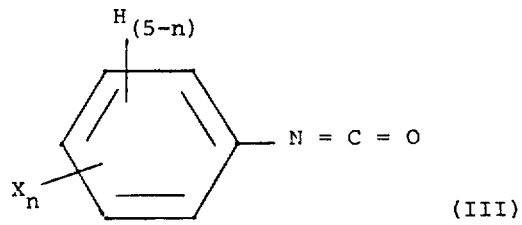

wherein X and $n$ are as heretofore described, with an about equimolar or excess molar amount of a hydrazine of the formula

wherein R is as heretofore described. This reaction can be effected by combining a solution of the isocyanate of formula III in an inert aromatic solvent such as benzene or methylene chloride with a solution of the hydrazine of formula IV in an inert organic solvent such as benzene or methylene chloride. The reaction mixture can be maintained at a temperature of from about $-20°$ to about 30°C with stirring for a period of up to about 1 hour. After this time additional solvent can be added and the reaction mixture can be optionally heated at reflux for a period of up to about 2 hours to ensure completion of the reaction. The reaction mixture can then be filtered to recover the solid product which has formed. This desired product can then be used as such or can be further purified by conventional means such as recrystallization and the like.

Exemplary suitable hydrazines of formula IV for preparing the compounds of the present invention are methylhydrazine, ethylhydrazine, propylhydrazine, isopropylhydrazine, n-butylhydrazine, sec-butylhydrazine, t-butylhydrazine, pentylhydrazine, hexylhydrazine and the like.

Exemplary isocyanates useful for preparing the compounds of the present invention are 2-methylphenyl isocyanate, 3-ethylphenyl isocyanate, 4-propylphenyl isocyanate, 4-butylphenyl isocyanate, 4-pentylphenyl isocyanate, 4-hexylphenyl isocyanate, 3-methoxyphenyl isocyanate, 2-ethoxyphenyl isocyanate, 4-propoxyphenyl isocyanate, 4-hexyloxyphenyl isocyanate, 2-methylthiophenyl isocyanate, 3-ethylthiophenyl isocyanate, 4-pentylthiophenyl isocyanate, 3-chlorophenyl isocyanate, 4-bromophenyl isocyanate, 3,4-dichlorophenyl isocyanate, 3,4,5-trichlorophenyl isocyanate, 4-iodophenyl isocyanate, 4-fluorophenyl isocyanate, 3-β-bromoethylphenyl isocyanate, 4-trichloromethylphenyl isocyanate, 4-trifluoromethylphenyl isocyanate, 2,6-dinitrophenyl isocyanate, 4- nitrophenyl isocyanate, 2-methyl-4-chlorophenyl isocyanate and the like.

The manner in which the compounds of the present invention can be prepared is more specifically illustrated in the following examples.

EXAMPLE 1

Preparation of
2-Methyl-4-(3-chlorophenyl)semicarbazide

A solution of methylhydrazine (8.6 grams) in methylene chloride (100 ml) was charged into a glass reaction vessel equipped with a mechanical stirrer and thermometer. The solution was cooled to a temperature of about 10°C and 3-chlorophenyl isocyanate (30 grams) was added with stirring resulting in the formation of a solid precipitate. The precipitate was recovered by filtration and was dried to yield the desired product 2-methyl-4-(3-chlorophenyl)semicarbazide.

EXAMPLE 2

Preparation of
2-Methyl-4-(3-chlorophenyl)-1,2,4-triazolidin-3-one

2-Methyl-4-(3-chlorophenyl)semicarbazide (10 grams), aqueous formaldehyde (6 ml; 37% concentration) and methanol (50 ml) were charged into a glass beaker at room temperature. Dilute aqueous potassium hydroxide was added to adjust the pH of the reaction medium to about 8. The mixture was stirred until homogeneous and allowed to stand for a period of about 6 hours. After this time the reaction mixture was stripped of water and methanol leaving a solid residue. The residue was then recrystallized from a water-acetone mixture to yield the desired product 2-methyl-4-(3-chlorophenyl)-1,2,4-triazolidin-3-one having a melting point of 62° to 63°C.

EXAMPLE 3

Preparation of
2-Methyl-4-(3,4-dichlorophenyl)semicarbazide

A solution of methylhydrazine (12.1 grams) in benzene (100 ml) and a solution of 3,4-dichlorophenyl isocyanate (50 grams) in benzene (150 ml) were charged into a glass reaction vessel equipped with a mechanical stirrer, thermometer and reflux condenser. The reaction mixture was stirred and the temperature was maintained between about 20° and 25°C with cooling for a period of ½ hour. After this time additional benzene (500 ml) was added to the reaction mixture and the mixture was heated to reflux. The mixture was then cooled and filtered to recover the solid product formed. The solid was then dried to yield the desired product 2-methyl-4-(3,4-dichlorophenyl)semicarbazide having a melt point of from 134° to 138°C.

EXAMPLE 4

Preparation of
2-Methyl-4-(3,4-dichlorophenyl)-1,2,4-triazolidin-3-one

2-Methyl-4-(3,4-dichlorophenyl)semicarbazide (12 grams), aqueous formaldehyde (5 ml; 37% concentration) and methanol (100 ml) were charged into a glass reaction vessel at room temperature. Dilute aqueous potassium hydroxide was added to adjust the pH of the reaction mixture to about 8. The mixture was stirred and allowed to stand for a period of about 2 hours. After this time the reaction mixture was stripped of water and methanol under vacuum to yield a solid. The solid was recrystallized from heptane to yield the desired product 2-methyl-4-(3,4-dichlorophenyl)-1,2,4-triazolidin-3-one having a melting point of 77° to 79°C.

EXAMPLE 5

Preparation of
2-Methyl-4-(2-methoxyphenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 2-methoxyphenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(2-methoxyphenyl)semicarbazide as the residue.

EXAMPLE 6

Preparation of
2-Methyl-4-(2-methoxyphenyl)-1,2,4-triazolidin-3-one

2-Methyl-4-(2-methoxyphenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(2-methoxyphenyl)-1,2,4-triazolidin-3-one.

EXAMPLE 7

Preparation of
2-Methyl-4-(4-methylthiophenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 4-methylthiophenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(4-methylthiophenyl)semicarbazide as the residue.

EXAMPLE 8

Preparation of
2-Methyl-4-(4-methylthiophenyl)-1,2,4-triazolidin-3-one

2-Methyl-4-(4-methylthiophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(4-methylthiophenyl)-1,2,4-triazolidin-3-one.

EXAMPLE 9

Preparation of
2-Ethyl-4-(4-bromophenyl)semicarbazide

A solution of ethylhydrazine (0.2 mole) in benzene (100 ml) is charged into a glass reaction vessel equipped with a mechanical stirrer and thermometer. The solution is cooled to a temperature of about 10°C and a solution of 4-bromophenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-ethyl-4-(4-bromophenyl)-semicarbazide as the residue.

EXAMPLE 10

Preparation of
2-Ethyl-4-(4-bromophenyl)-1,2,4-triazolidin-3-one

2-Ethyl-4-(4-bromophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-ethyl-4-(4-bromophenyl)-1,2,4-triazolidin-3-one.

EXAMPLE 11

Preparation of
2-Methyl-4-(2-methyl-4-chlorophenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 2-methyl-4-chlorophenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(2-methyl-4-chlorophenyl)semicarbazide as the residue.

EXAMPLE 12

Preparation of
2-Methyl-4-(2-methyl-4-chlorophenyl)-1,2,4-triazolidin-3-one

2-Methyl-4-(2-methyl-4-chlorophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(2-methyl-4-chlorophenyl)-1,2,4-triazolidin-3-one.

EXAMPLE 13

Preparation of
2-Methyl-4-(4-trifluoromethylphenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 4-trifluoromethylphenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(4-trifluoromethylphenyl)semicarbazide as the residue.

EXAMPLE 14

Preparation of
2-Methyl-4-(4-trifluoromethylphenyl)-1,2,4-triazolidin-3-one

2-Methyl-4-(4-trifluoromethylphenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(4-trifluoromethylphenyl)-1,2,4-triazolidin-3-one.

EXAMPLE 15

Preparation of
2-Methyl-4-(4-nitrophenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 4-nitrophenyl isocyanate (0.2 mole) in benzene is added with stirring. After the addition is completed stirring is continued for a period of about 30 minutes. After this time the reaction mixture is stripped of solvent under reduced pressure to yield the desired product 2-methyl-4-(4-nitrophenyl)semicarbazide as the residue.

EXAMPLE 16

Preparation of
2-Methyl-4-(4-nitrophenyl)-1,2,4-triazolidin-3-one

2-Methyl-4-(4-nitrophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(4-nitrophenyl)-1,2,4-triazolidin-3-one.

Additional compounds within the scope of the present invention and which can be prepared by the procedures detailed in the foregoing examples are 2-methyl-4-(3-ethylphenyl)-1,2,4-triazolidin-3-one, 2-ethyl-4-

(4-propylphenyl)-1,2,4-triazolidin-3-one, 2-propyl-4-(3-pentylphenyl)-1,2,4-triazolidin-3-one, 2-butyl-4-(4-hexylphenyl)-1,2,4-triazolidin-3-one, 2-hexyl-4-(2,6-dimethylphenyl)-1,2,4-triazolidin-3-one, 2-methyl-4-(3-ethoxyphenyl)-1,2,4-triazolidin-3-one, 2-methyl-4-(4-butoxyphenyl)-1,2,4-triazolidin-3-one, 2-isopropyl-4-(4-hexyloxyphenyl)-1,2,4-triazolidin-3-one, 2-t-butyl-4-(3-chloromethylphenyl)-1,2,4-triazolidin-3-one, 2-methyl-4-(4-β-chloroethylphenyl)-1,2,4-triazolidin-3-one, 2-methyl-4-(4-β-bromoethylphenyl)-1,2,4-triazolidin-3-one, 2-methyl-4-(3,4-dibromophenyl)-1,2,4-triazolidin-3-one, 2-methyl-4-(4-fluorophenyl)-1,2,4-triazolidin-3-one, 2-methyl-4-(4-iodophenyl)-1,2,4-triazolidin-3-one, 2-methyl-4-(2,4,5-trichlorophenyl)-1,2,4-triazolidin-3-one, 2-methyl-4-(2-ethylthiophenyl)-1,2,4-triazolidin-3-one, 2-methyl-4-(3-propylthiophenyl)-1,2,4-triazolidin-3-one, 2-methyl-4-(4-butylthiophenyl)-1,2,4-triazolidin-3-one and 2-methyl-4-(4-hexylthiophenyl)-1,2,4-triazolidin-3-one.

To effect the method of this invention the plants having storage organs can be treated from the time of their planting to within a late stage of development with an effective amount of an active compound of this invention. Typically the treatment can be carried out at a time period ranging from the time of planting to about two weeks before normal harvesting of the plants.

The amount of the active compound of this invention required to effectively increase the amount of food in the storage organs of plants can vary somewhat depending on such factors as the particular plant involved, the time of application, the weather, crop density and the like. Generally an amount of at least about 0.05 pounr per acre and preferably from about 0.1 to about 4 pounds per acre can be used.

For practical use in treating plants with storage organs the compounds of this invention are generally incorporated into compositions or formulations which comprise an inert carrier and an effective amount of such a compound. These compositions enable the active compound to be conveniently applied to the plants in any desired quantity. These compositions can be liquids such as solutions, aerosols or emulsifiable concentrates or they can be solids such as dusts, granules or wettable powders.

The preferred compositions are liquid formulations, particularly emulsifiable concentrates. Emulsifiable concentrates comprise an active compound according to this invention and as the inert carrier, a solvent and an emulsifier. Such emulsifiable concentrates can be extended with water and/or oil to any desired concentration of active compound for application as sprays to the plants.

Typical formulations according to the present invention are illustrated in the following examples wherein the quantities are in parts by weight.

EXAMPLE 17

Preparation of an Emulsifiable Concentrate

The following ingredients are blended thoroughly until a homogeneous liquid concentrate is obtained. This concentrate is mixed with water to give an aqueous dispersion containing the desired concentration of the active ingredients for use as a spray.

| Product of Example 2 | 25 |
| Sodium lauryl sulfate | 2 |
| Sodium lignin sulfate | 3 |
| Kerosene | 70 |

EXAMPLE 18

Preparation of a Wettable Powder

The following components are mixed intimately in conventional mixing or blending equipment and are then ground to a powder having a particle size of less than about 50 microns. The finished powder is dispersed in water to give the desired concentration of active compound.

| Product of Example 4 | 50 |
| Fuller's earth | 47 |
| Sodium lauryl sulfate | 2.5 |
| Methyl cellulose | 0.5 |

EXAMPLE 19

Preparation of a Dust

The following ingredients are mixed thoroughly and are then ground to an average particle size of less than about 50 microns to give a dust suitable for application with conventional dusting equipment.

| Product of Example 2 | 10 |
| Powdered talc | 90 |

The plants with storage organs which may be treated in accordance with the present invention include tuberous species such as potato, sweep potato, yam, cassava, Jerusalem artichoke, Cyperus esculentus and dahlias; species having storage roots such as carrot, turnip, radish, beet including sugar beet; bulb bearing species such as onion, tulip and daffodil; species bearing thickened rhizomes such as iris; and species storing sugar or starch in the stem such as sugar cane, sage and the like.

The treatment of these various plants in accordance with the invention increases the content of plant food in the storage organs. This increase is typically an absolute increase, but can be an increase relative to plant weight. Thus, for example, the treatment of potatoes results in an increase in the size and total weight of potatoes per potato plant. Treatment of other plant species of the kind described produces similar increases in the amount of food contained in the storage organs. Often this result is partly due to a modification of the foliar development.

I claim:

1. A method of increasing the yield of plant food contained in plant storage organs which comprises contacting the plants having storage organs with from about 0.05 to about 4.0 pounds per acre of a compound of the formula

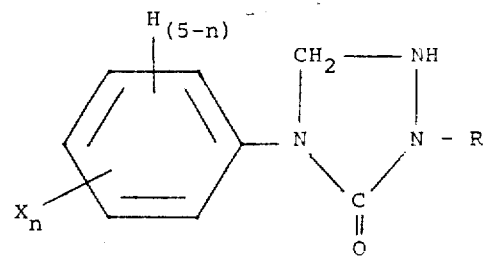

wherein X is selected from the group consisting of lower alkyl, lower alkoxy, lower alkylthio, halogen, lower haloalkyl and nitro; n is an integer from 1 to 3; and R is lower alkyl.

2. The method of claim 1 wherein the compound is 2-ethyl-4-(5-bromophenyl)-1,2,4-triazolidin-3-one.

3. The method of claim 1 wherein the compound is 2-methyl-4-(3-chlorophenyl)-1,2,4-triazolidin-3-one.

4. The method of claim 1 wherein the compound is 2-methyl-4-(3,4-dichlorophenyl)-1,2,4-triazolidin-3-one.

5. The method of claim 1 wherein the compound is 2-methyl-4-(2-methoxyphenyl)-1,2,4-triazolidin-3-one.

6. The method of claim 1 wherein the compound is 2-methyl-4-(4-methylthiophenyl)-1,2,4-triazolidin-3-one.

7. The method of claim 1 wherein the plant is a potato plant.

* * * * *